March 3, 1942.   F. SMITH   2,275,114
PARACHUTE APPARATUS
Filed May 22, 1939   2 Sheets-Sheet 1

INVENTOR.
Floyd Smith
BY Lancaster, Allwine & Rommel
ATTORNEYS.

March 3, 1942.  F. SMITH  2,275,114

PARACHUTE APPARATUS

Filed May 22, 1939    2 Sheets-Sheet 2

INVENTOR.
Floyd Smith

BY *Lancaster, Allwine and Rommel*
ATTORNEYS.

Patented Mar. 3, 1942

2,275,114

UNITED STATES PATENT OFFICE 2,275,114

PARACHUTE APPARATUS

Floyd Smith, Buffalo, N. Y., assignor to Irving Air Chute Co. Inc., Buffalo, N. Y., a corporation Application May 22, 1939, Serial No. 275,104

5 Claims. (Cl. 244—151)

This invention relates to improvements in parachute apparatus.

The primary object of this invention is the provision of improved parachute harness and pack wherein the pack is of the detachable emergency type such as has generally been set forth in U. S. Patent #1,958,000, and wherein the parachute harness has improved means for automatically tightening the same upon the wearer during a parachute drop.

A further object of this invention is the provision of improved parachute harness of the single connector type having an improved automatic tightening feature which operates during a parachute drop to safely retain the parachute harness upon the aviator.

Other objects and advantages of the invention will be apparent during the course of the following detailed description.

In the accompanying drawings, forming a part of this specification, and wherein similar reference characters designate corresponding parts throughout the several views, Figure 1 is a perspective view of the improved parachute harness showing the application of the same with a standard seat pack.

Figure 1:
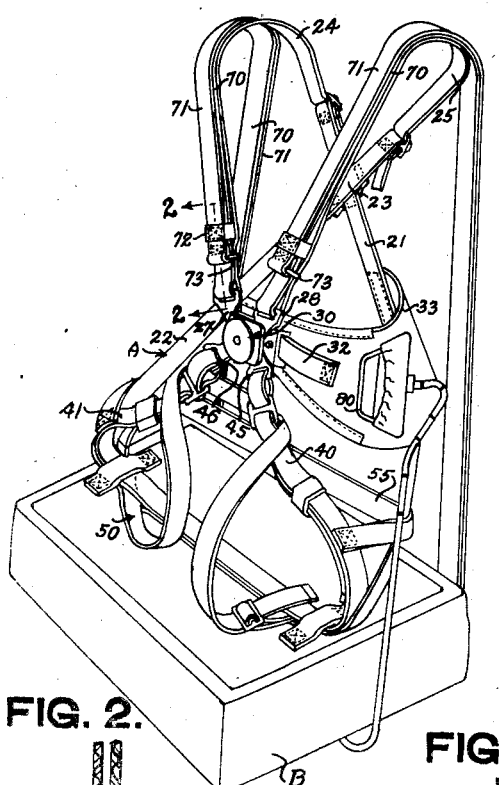

In the drawings, wherein for the purpose of illustration are shown preferred and modified form of the invention, the letter A may generally designate a quick release harness of the general character set forth in U. S. Patents #1,899,656 and #1,842,611, but embodying an improved automatic tightening feature. This harness may be used with a standard parachute pack B.

Figure 3:
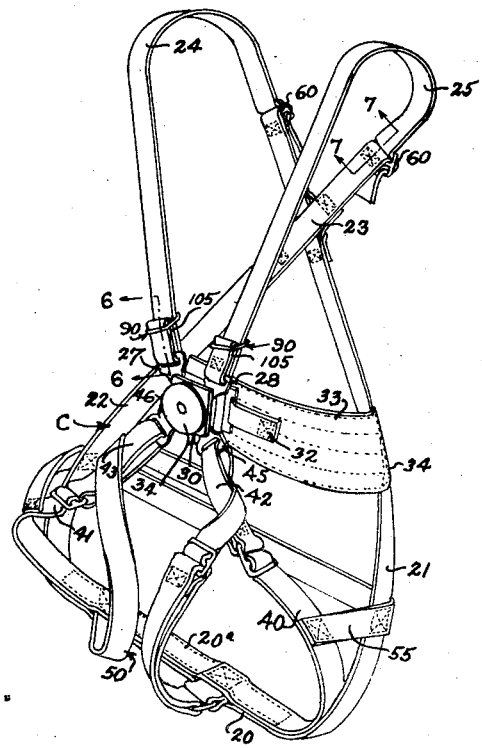
Figure 3 is a perspective view of a quick connector harness embodying my improved automatic tightening feature as adapted for use with quick connector emergency packs.
Figure 4:
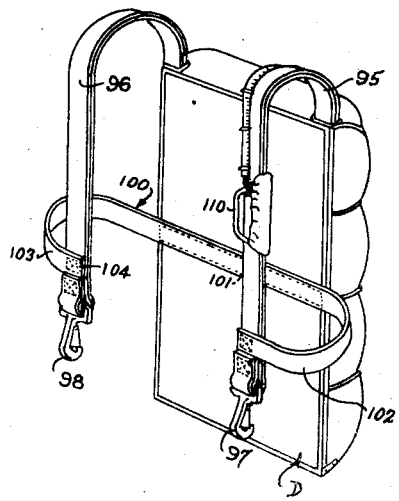
Figure 4 is an improved type of quick connector emergency pack which may be used with the harness of Figure 3, although the latter is not limited to use with such pack.
Figure 5:
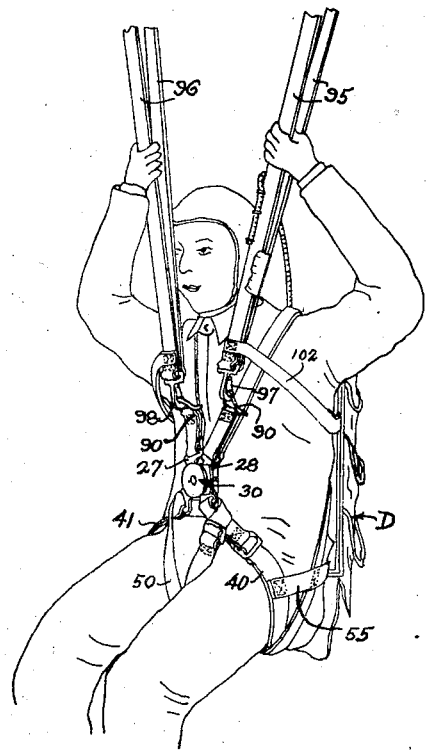
Figure 5 is a perspective view showing the application of the harness upon a wearer, the harness being of the type shown in Figure 3, in co-operation with a pack such as shown in Figure 4; the parachute being deployed and supporting the wearer during a parachute descent.

Another type of quick release harness C shown in Figures 3 and 5 of the drawings, also embodying the improved automatic tightening feature may be used for receiving quick connector packs, such as the pack D shown in Figure 4, or for use with such packs as shown in U. S. Patent #1,958,000, or other types of quick connector packs, the purpose of which is to insure quick attachment of the pack to the harness at the time of an emergency.

As before mentioned the harnesses A and B partake generally of the harness set forth in U. S. Patent #1,899,656. They each include a seat strap 20 which extends under the seat of the wearer and extends upwardly at 21 and 22 at opposite sides of the wearer forming back straps which cross at 23 where slip loop connections may be provided, if desired. These back straps 21 and 22 continue over the shoulders of the wearer forming shoulder straps 24 and 25 respectively which extend downwardly at the front of the wearer and are there provided with suitable fittings 27 and 28 for releasable connection with a single point release connector 30. This is of the general nature set forth in U. S. Patents Nos. 1,899,656 and 1,842,611. The connector 30 may be slidably supported upon a loop or strip of material 32 carried by a side belt 33 which is stitched at 34 to one of the back straps 21. This connector may be mounted in any approved manner such as in general use, or as set forth in a co-pending application Serial No. 717,857, filed March 28, 1934. The connector includes spring urged detents and suitable sockets in which detents cooperate for receiving the fittings 27. The detents normally snap into position to retain the fittings 27 and 28 in place and they are only released upon pressing the turn button 34 which enables the fittings to be instantly released from the connector. Of course any desired number of fittings, detents and sockets may be provided for the connector 30, depending upon the number of strap ends of the harness which are to be connected together in order to encase the harness upon the wearer.

In addition to the above described construction of the harnesses A and C, each of the same furthermore includes a second seat strap 20ᵃ which is stitched to the seat strap 20 above described at the sides of the wearer provided with lower body attaching strap ends 40 and 41. These strap ends are doubled upon themselves at their ends to provide adjustable loops 42 and 43 respectively which are threaded through fittings 45 and 46 respectively. These fittings 45 and 46 are similar to the fittings 27 and 28 above described and are adapted for detachable association with the connector device 30.

In association with the seat strap construction of the harness there is provided a loop 50 connected at ends in spaced relation upon the seat strap construction; this loop being adapted to be extended upwardly between the legs of the wearer. It is size adjustable by reason of suitable couplings and doubled portions and the strap ends 40 and 41 are adapted to be threaded therethrough in order to provide leg encircling straps through which the legs of the wearer are extended when the fittings 45 and 46 are connected with the connector 30.

In association with the quick connector harnesses A and B any other strap or pad accessories may be used, such as the lower cross strap 55, which may be connected as shown in order to retain the wearer from falling backwardly through the lower portion of the harness during a parachute drop.

Figure 7:
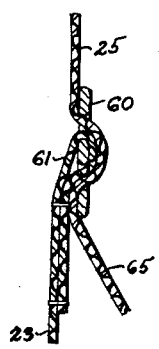

As one improved feature of the harness the back straps 21 and 22 near the shoulders of the wearer, but at the back of the wearer, have suitable adjusting means which is intended to be used for initially adjusting the harness to the stature of the wearer. This adjusting means has no automatic tightening effect, but as shown in Figure 7 of the drawings, consists of a metal coupling part 60 having spaced slots therein. The shoulder straps 24 and 25 have their ends threaded through both of the slots in the coupling part 60 and the back strap 21 or 22, as the case may be, is permanently looped at 61 through the slots of the coupling part 60. Thus the free end of the shoulder strap, designated at 65 in Figure 7 of the drawings, may be used to take up any slack in the harness when initially adjusted upon the wearer. The coupling 60 tightly retains the shoulder and back straps in connected adjustment, since when they are in position the pull upon the shoulder or back straps will not permit them to slide through the coupling, as is quite obvious from Figure 7.

The primary invention in the harness consists in the means by which the fittings 27 and 28 are connected upon the front-shoulder straps 24 and 25, and the means by which suspension straps and packs are associated therewith. Thus, for the type of harness A, with which the standard seat pack B is used, each front-shoulder strap 24 and 25 has the fastener part slidably connected thereon, and the respective strap is then continued at 70 to form one of the suspension lines which enters the parachute pack and is there connected in the conventional manner to the shroud lines and parachute canopy, as well known in the art and more fully detailed in U. S. Patents Nos. 1,554,192 and 1,560,366. Overlying each of the suspension lines 70 there is another suspension line 71 which is suitably stitched at 72 to the suspension line 70 at a point above the fitting 27 or 28, as the case may be. This suspension line 71 is doubled at its lower end and looped about one bar of the slidable metal loop fitting 73 which is threaded upon the front-shoulder strap 24 or 25, as the case may be, as shown in Figure 2 of the drawings.

The parachute pack B is of the usual type and opened by means of a rip cord which has a handle 80 positioned at some location on the harness, as shown in Figure 1. Upon opening of the parachute pack the canopy is deployed and when the wearer of the load has dropped after deployment of the main canopy the suspension lines 70 and 71 will of course suspend the wearer from the parachute. The weight of the wearer or load will tend to tighten the shoulder straps 24 and 25 upon the wearer, thus pulling the upper body straps of the harness down upon the wearer and the lower body straps upwardly inasmuch as the continued portions of the suspension lines slide through the fittings 27 and 28, as can readily be understood from Figure 2 of the drawings. The loop fitting 73 maintains the suspension points upon the harness close to the wearer, and of course as the harness is tightened upon the wearer these suspension points move close to the shoulders of the wearer.

It is entirely possible to make this suspension point at the rear of the harness on the shoulder-back straps, if desired.

Figure 2:
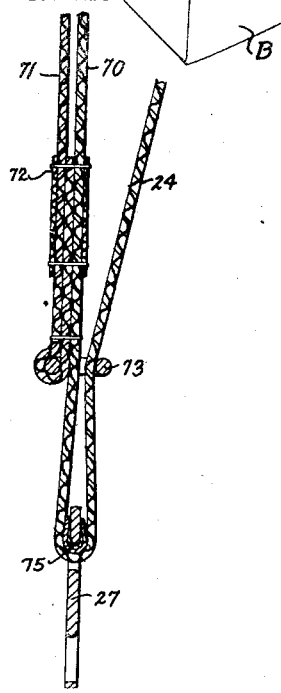
Figure 2 is a cross sectional view taken substantially on the line 2—2 of Figure 1, and showing the improved automatic tightening feature of the harness.
Figure 6:
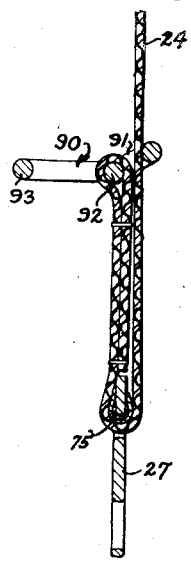
Figures 6 and 7 are cross sectional views taken substantially on their respective lines in Figure 3 of the drawings.

It is to be noted from Figure 2 of the drawings that the fittings 27 may be provided with curved plates, or even anti-friction means, at the point 75, shown in Figure 2 of the drawings, so that the bight of the suspension lines may readily pass through the slot without undue restriction.

It is entirely possible to use some of the features of the improved harness A, shown in Figure 1, with the conventional Hamer detachable emergency pack such as shown in U. S. Patent #1,958,000. Thus, the suspension lines 70 and 71 may be doubled forwardly upon the front of the harness of the wearer, as shown in Figure 1 of said U. S. Patent #1,958,000 and snap fasteners or other suitable coupling parts provided in definitely disposed relation upon the harness for receiving complementary coupling parts of the detachable emergency pack, such as set forth in said patent.

For the improved harness C of the present invention I prefer to provide a specially constructed detachable emergency pack, preferably a back pack, although the harness C is not to be limited in its application thereto.

The harness C has the fastener parts 27 and 28 connected to the front-shoulder straps 24 and 25, in the same manner as above described for the harness A. However, slidable coupling members 90, preferably of metal are provided, having a small eye or loop opening 91 through which the body of the front-shoulder strap is respectively threaded; the end of said strap being looped about a center bar 92 of said coupling part. This arrangement supports the coupling parts with outstanding coupling eyes 93. They receive the complementary coupling parts of the detachable emergency pack. Such detachable emergency pack may be of any approved construction. Thus, as one embodiment I have provided the pack D, preferably a back pack, which insofar as the container, parachute and suspension lines are concerned may generally partake of the nature of the parachute apparatus set forth in U. S. Patents #1,340,423; 1,403,983; and 1,462,456. These suspension lines 95 and 96 are of course adapted to be looped over the shoulders and extended downwardly at the front of the wearer. As is well understood in the art they are connected to the parachute shroud lines and readily exit from the container upon application of the load to the deployed parachute canopy. The suspension lines 95 and 96 at their outer ends are provided with coupling parts 97 and 98 adapted for respective connection to the coupling eye portions 93 of the coupling members 90 above described, in the manner shown in Figure 5 of the drawings. In order to maintain the pack D efficiently upon the body of the wearer, lateral strap means is provided, in the nature of a band 100 stitched at 101 to the back wall of the pack D and extended at opposite sides at 102 and 103 for stitched connection at 104 with the suspension lines 95 and 96 respectively adjacent to the coupling snaps 97 and 98.

The harness C is applied upon the wearer in a manner which is quite apparent from the foregoing description. The major adjustments of the harness are of course accomplished upon the leg straps and loops 40—41—50 and at the coupling connections 60 upon the back straps adjacent to the shoulders. Thus, in comfortable manner the harness C may be applied upon the wearer and the emergency pack need only be applied to the wearer in cases of emergency. While any type of detachable pack may be used, the pack D is one which is very convenient to use, since it is only necessary for the wearer to slip his arms through the loops formed by the suspension line-shoulder straps of the pack construction D and snap the couplings 97 and 98 upon the coupling eyes 93 of the couplings 90. The cross strap construction 100 thus forms a sort of belt which maintains the back pack snugly against the back of the wearer. This is important because the pack may be both quickly applied and instantly discarded, as is desired, without the necessity of manually fumbling with the waist belt, etc.

The detachable emergency pack D has any approved type of rip cord construction, and in the preferred instance the rip cord may have a handle 110 which is detachably positioned upon a suitable pocket mounted upon one of the suspension lines or webs.

In the harness C adapted to receive the detachable emergency pack disposal of the coupling parts 90 may be releasably set upon the shoulder webs 24 and 25 by means of break threads 105. They rupture when the parachute opens.

Various changes in the shape, size, and arrangement of parts may be made to the form of invention herein shown and described, without departing from the spirit of the invention or the scope of the claims.

I claim:

1. In parachute harness the combination of lower body attaching straps, upper body attaching straps including front-shoulder straps adapted for disposal over the shoulders and at the front of the wearer, coupling means for connecting the ends of said front-shoulder straps with the lower body attaching straps including fastener parts slidable upon said front-shoulder straps, a parachute pack including a canopy, and means connecting the parachute canopy with the front-shoulder straps in such manner as to tighten the harness upon the wearer's body during a parachute drop by the slip pulling of the front-shoulder straps through said fastener parts.

2. In a parachute harness the combination of lower body atttaching straps, upper body attaching straps, fasteners adjustably connected upon the ends of said lower body attaching straps and upper body attaching straps, a quick release coupling device for releasable connection of said fastener parts, the upper body attaching straps being slidably threaded through their respective fastener parts and having the suspension ends thereof doubled back upon themselves respectively and provided with affixed couplings slidable along the respective upper body attaching straps upon which they are doubled.

3. In a parachute harness the combination of lower body attaching straps, upper body attaching straps, fasteners adjustably connected upon the ends of said lower body attaching straps and upper body attaching straps, a quick release coupling device for releasable connection of said fastener parts, the upper body attaching straps being slidably threaded through their respective fastener parts and having the suspension ends thereof doubled back upon themselves respectively and provided with affixed couplings slidable along the respective upper body attaching straps upon which they are doubled, and a detachable emergency pack having complementary coupling parts for detachable connection with the last mentioned couplings whereby during a parachute drop application of load upon the parachute will automatically slip tighten the body straps upon the wearer.

4. In a parachute harness the combination of lower body attaching straps, upper body attaching straps, fasteners adjustably connected upon the ends of said lower body attaching straps and upper body attaching straps, a quick release coupling device for releasable connection of said fastener parts, the upper body attaching straps being slidably threaded through their respective fastener parts and having the suspension ends thereof doubled back upon themselves respectively and provided with affixed couplings slidable along the respective upper body attaching straps upon which they are doubled, a parachute pack including a parachute canopy having suspension lines extending from the pack and provided with coupling parts for releasable connection with the couplings last mentioned, and belt strap means connected with the pack and with said suspension lines adjacent to the coupling parts of said suspension lines for holding the pack against the body of the wearer.

5. Parachute apparatus comprising lower body attaching straps, upper body attaching straps, means for releasably connecting the lower and upper body attaching straps together at the front of a wearer, the upper body attaching straps including shoulder straps which extend downwardly at the front of the wearer and have a slidable connection with said last mentioned means which serves to draw the upper and lower body attaching straps together, a parachute, and means to connect the parachute with said shoulder straps beyond the slip connection so that upon opening of the parachute the weight of the load will draw said shoulder straps through said fastening means to render the harness tight upon the wearer as aforesaid.

FLOYD SMITH.